(12) United States Patent
Ham

(10) Patent No.: US 7,546,119 B2
(45) Date of Patent: Jun. 9, 2009

(54) CHANGING OPERATION PARAMETER OF COMMUNICATION TERMINAL

(75) Inventor: Young-Cheol Ham, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 513 days.

(21) Appl. No.: 11/319,437

(22) Filed: Dec. 29, 2005

(65) Prior Publication Data

US 2006/0154605 A1 Jul. 13, 2006

(30) Foreign Application Priority Data

Jan. 7, 2005 (KR) .................. 10-2005-0001872

(51) Int. Cl.
*H04M 3/00* (2006.01)
*H04W 4/00* (2009.01)
*H04B 7/00* (2006.01)

(52) U.S. Cl. .................. 455/419; 370/310

(58) Field of Classification Search .......... 455/418, 455/419, 422.1
See application file for complete search history.

(56) References Cited

U.S. PATENT DOCUMENTS

| | | | | |
|---|---|---|---|---|
| 6,839,553 B2* | 1/2005 | Park | .............. | 455/411 |
| 2002/0160763 A1* | 10/2002 | Mittal et al. | .............. | 455/418 |
| 2004/0133887 A1* | 7/2004 | Herle et al. | .............. | 717/171 |
| 2004/0266426 A1* | 12/2004 | Marsh et al. | .............. | 455/426.2 |

* cited by examiner

*Primary Examiner*—Alexander Eisen
*Assistant Examiner*—Michael T Thier
(74) *Attorney, Agent, or Firm*—Robert E. Bushnell, Esq.

(57) ABSTRACT

A system and method for changing an operation parameter of a communication terminal are provided, in which necessary software is transmitted using an SMS/SIP message so that a WLAN phone, such as a WiFi phone, can maintain an optimum operation condition. The system for automatically changing an operation parameter of a communication terminal includes: a user DB storing upgrade information of an operation parameter of the communication terminal; and an upgrade server determining whether the operation parameter needs to be upgraded with reference to the user DB, and providing new operation parameter information to the communication terminal when the operation parameter needs to be upgraded.

15 Claims, 3 Drawing Sheets

CHANGING OPERATION PARAMETER OF COMMUNICATION TERMINAL

CLAIM OF PRIORITY

This application makes reference to, incorporates the same herein, and claims all benefits accruing under 35 U.S.C. §119 from an application for SYSTEM AND METHOD FOR CHANGING OPERATION PARAMETER OF COMMUNICATION TERMINAL, earlier filed in the Korean Intellectual Property Office on Jan. 7, 2005 and there duly assigned Serial No. 2005-1872.

BACKGROUND OF THE INVENTION

1. Field of the Invention

The present invention relates to a system and method for changing an operation parameter of a communication terminal, and more particularly, to a system and method for changing an operation parameter of a mobile terminal which transmits necessary software using a SMS/SIP message so that a Wireless Local Area Network (WLAN) terminal such as a WiFi phone can be maintained in optimum operating condition.

2. Description of the Related Art

As use of the Internet spreads, the Internet, together with mobile telephones, is recently being considered to be an almost universal communication system, and the population of Internet users is increasing exponentially. Internet telephones that operate over the Internet at a low cost have been developed. The Internet telephones enable a telephone call between two parties using communication systems working within a wired Internet network. In order to implement a portable telephone function in the Internet telephone, a WLAN terminal that integrates Voice over Internet Protocol (VoIP) with a WLAN has been developed.

The added value obtained by a wired telephone network is far smaller than the added value obtained by a wireless communication network. For example, the wireless communication network provides not only various contents and services such as a Short Message Service (SMS), an Enhanced Message Service (EMS), a Multimedia Message Service (MMS), and various games and video solutions, but also mobility and an access method by which a user can conveniently access the wireless communication network, whereas the wired telephone network provides only voice-oriented services.

IEEE 802.11 WLAN technology for implementing a WLAN terminal is being developed, and demand for the WLAN is increasing. The WLAN uses a radio wave or infrared transfer method, and through the WLAN, a plurality of wireless communication terminals, e.g., Personal Digital Assistants (PDAs) or laptop computers, can use the Internet at a high-speed within a predetermined distance from a place where an Access Point (AP) has been installed.

While "HiFi" stands for high fidelity in the field of audio systems, "WiFi" stands for wireless fidelity. The term WiFi has been adopted for convenience in the field of wireless communication networks. A telephone used in a wireless communication network is called a WLAN phone or a WiFi phone.

The WLAN terminal, i.e., WiFi phone, has disadvantages in that in IP network interfacing with the WLAN, it is impossible to simply change parameters which are upgraded during operation of the phone. Instead, changeable parameters have to be upgraded at an A/S center, which is very inconvenient. Even though the WLAN terminal does not upgrade the parameters, a call operation is supported, but since newly added functions cannot be performed, a user is inconvenienced and unsatisfied, and the WiFi phone appears out of date.

SUMMARY OF THE INVENTION

It is, therefore, an object of the present invention to provide a system and method of changing an operation parameter of a communication terminal, in which necessary software is received via a predetermined message to maintain the latest functional operation condition so that the communication terminal is rapidly and accurately adapted to a network environment to maintain an optimum operation condition.

According to an aspect of the present invention, a system of changing an operation parameter of a communication terminal is provided, the system comprising: a user database adapted to store upgrade state information of an operation parameter of the communication terminal; and an upgrade server adapted to determine whether the operation parameter needs to be upgraded with reference to a user database and to provide new operation parameter information to the communication terminal upon a determination that the operation parameter needs to be upgraded.

The system preferably further comprises a Session Initiation Protocol (SIP) server adapted to receive an SIP message containing version information from the communication terminal and to transmit the version information to the upgrade server, and to receive new operation parameter information from the upgrade server and to transmit an SIP message containing the new operation parameter information to the corresponding communication terminal.

The system preferably further comprises a Short Message Service (SMS) server adapted to receive an SMS message containing version information from the communication terminal and to transmit the version information to the upgrade server, and to receive new operation parameter information from the upgrade server and to transmit an SMS message containing the new operation parameter information to the corresponding communication terminal.

The system preferably further comprises a soft switch adapted to perform a Session Initiation Protocol (SIP) registration procedure from the communication terminal and to transmit one of the SIP message and a Short Message Service (SMS) message containing the new parameter information to the communication terminal.

The system preferably further comprises an Access Point (AP) arranged between the communication terminal and the soft switch and adapted to allow medium access according to a rule of one of competition and non-competition.

The communication terminal preferably comprises a Wireless Local Area Network (WLAN) terminal including one of a WiFi phone, a Zigbee phone, a Bluetooth phone, and a UWB phone.

The upgrade server preferably comprises a database installed therein and adapted to store the new operation parameter information.

According to another aspect of the present invention, a method of changing an operation parameter of a communication terminal is provided, the method comprising: recognizing that an operation parameter in a database includes a new upgraded parameter; searching for at least one communication terminal needing to be upgraded to the new parameter; and performing an upgrade procedure for the at least one communication terminal to provide the new parameter.

The method preferably further comprises: recognizing a register message of the communication terminal; identifying version information of the communication terminal from the register message; determining whether the version information belongs to a new communication terminal which has not been registered; and performing an upgrade procedure for the new communication terminal to provide the new parameter.

The upgrade procedure preferably comprises: producing a Session Initiation Protocol (SIP) message containing the new parameter; and transmitting the SIP message to the communication terminal via a network.

The new parameter preferably includes at least one of a call-related parameter, an SIP stack parameter, and a multimedia message service parameter.

The method preferably further comprises receiving and relaying the SIP message to the communication terminal via a Wireless Local Area Network (WLAN).

The communication terminal preferably comprises a WLAN terminal including one of a WiFi phone, a Zigbee phone, a Bluetooth phone, and a UWB phone.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF THE INVENTION

The present invention will now be described more fully with reference to the accompanying drawings, in which exemplary embodiments of the present invention are shown. The present invention can, however, be embodied in different forms and should not be construed as being limited to the embodiments set forth herein. Rather, these embodiments are provided so that this disclosure will be thorough and complete, and will fully convey the concept of the present invention to those skilled in the art.

Figure 1:
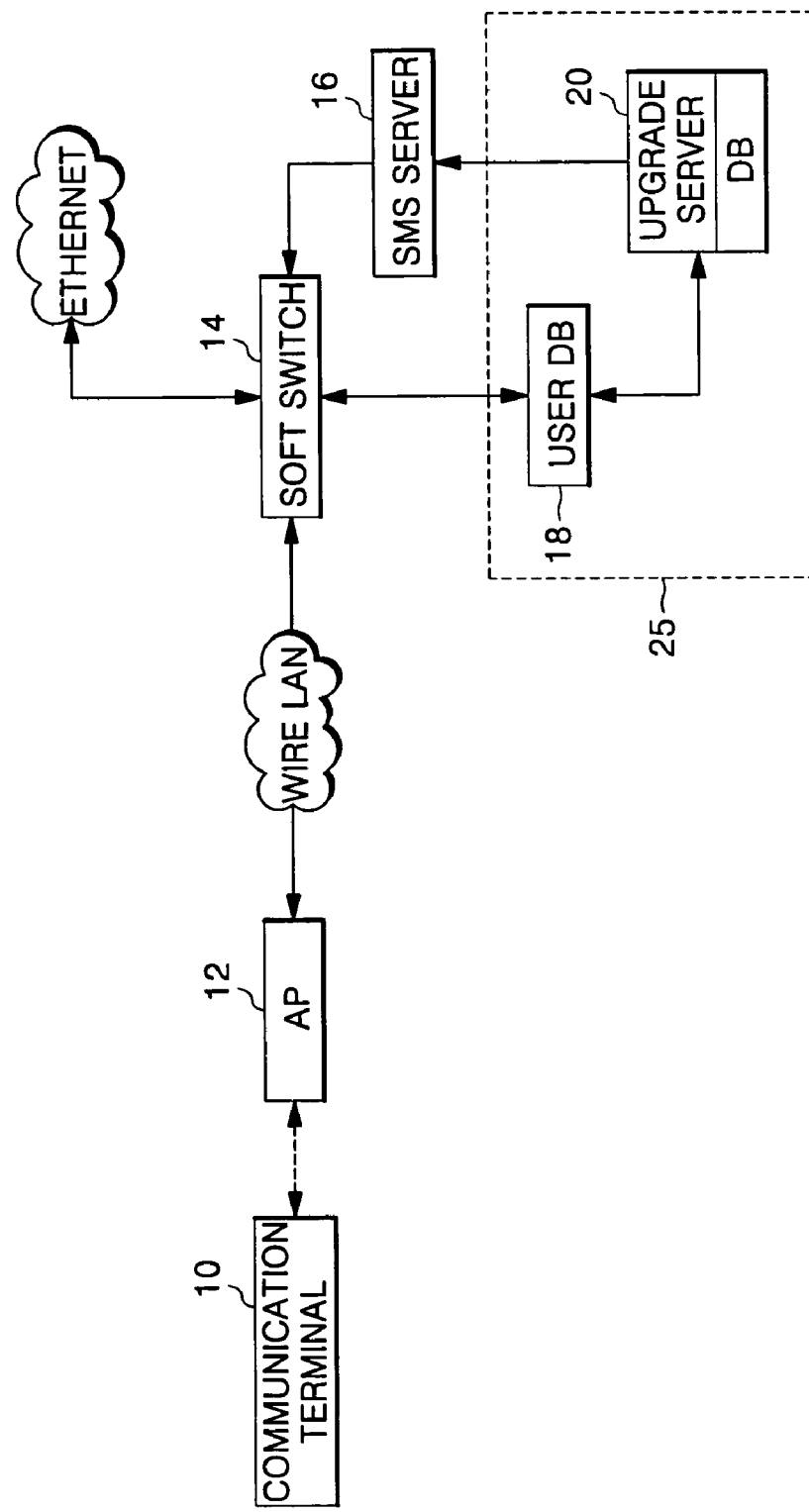
FIG. 1 is a block diagram of a system of changing an operation parameter of a communication terminal using a network according to an embodiment of the present invention.

FIG. 1 is a block diagram of a system of changing an operation parameter of a communication terminal using a network according to an embodiment of the present invention.

The system of changing the operation parameter according to the present invention is a system for upgrading parameters of software embedded in a communication terminal during operation of the communication terminal using a call session, a Session Initiation Protocol (SIP) message, or an SMS message. The communication terminal can upgrade an operation parameter of a necessary program therein through either a wireless or a wire communication network. However, for convenience, upgrading of an operation parameter of a WiFi phone operating in a WLAN will be described herein. The WiFi phone is a WLAN terminal and has the same or similar function as, for example, a Zigbee phone, a UWB phone, or a Bluetooth phone. The WiFi phone can be replaced by a wired terminal, and thus is hereinafter referred to as a "communication terminal".

As shown in FIG. 1, the system of changing the operation parameter of the communication terminal provides various services as well as a call service via an Access Point (AP) 12 according to a SIP method such as a session initiation, response, and completion in a VoIP-based SIP. The system includes at least one portable communication terminal 10 and a terminal information upgrader 25 which determines version information of the communication terminal 10 and an operation parameter for a program of the communication terminal 10 and upgrades the version information and operation parameter according to the determination result.

The AP 12 is arranged based on a WLAN between each of a plurality of communication terminals 10 and the terminal information upgrader 25, and allows a medium access according to a rule of competition or non-competition. A soft switch 14 based on a wired LAN and an SIP server 16 are arranged on the other side of the AP 12.

The soft switch 14 analyzes a received data packet and then transmits it to a corresponding server when an SIP session is initiated by the communication terminal 10. Also, the soft switch 14 analyzes a data packet of a register message according to an SIP registration procedure to identify version information of the communication terminal, and contacts the terminal information upgrader 25 and has it perform a registration procedure.

In order to have the communication terminal 10 upgrade the software parameters for its operation, the soft switch 14 receives the register message according to the SIP registration procedure to identify the version information of the communication terminal 10 from the SIP message, determines if the communication terminal is a new communication terminal by using the version information, and then begins the upgrade procedure. If a new software parameter is upgraded in a database (DB) of the terminal information upgrader 25, the new software parameter is transmitted to all registered communication terminals 10, thereby performing the upgrade procedure.

For clarity and convenience, the software version information of the communication terminal for analysis of the register message according to the registration procedure of the communication terminal is referred to as simply "version information", and the software parameter information for operation is referred to as simply "parameter information". A new communication terminal that has old version information and version information before upgrading is referred to as a "new communication terminal", and a software parameter before and after upgrading is referred to as an "old parameter" and a "new parameter", respectively.

The SIP server 16 inserts a new parameter from the terminal information upgrader 25 into an information element identifier field in a reserved region of a data packet header of the SIP message and transmits the data packet to the corresponding communication terminal 10 via the soft switch 14 and the AP 12, thereby performing the upgrade procedure. At least one of a call-related parameter, an SIP stack parameter, and an MMS-related parameter can be inserted into the information element identifier field.

The terminal information upgrader 25 can include a user DB 18 and an upgrade server 20. The user DB 18 receives the version information of the communication terminal 10 from the soft switch 14 and determines whether to upgrade to the new parameter if it is the new communication terminal of the old version. The upgrade server 20 transmits the new parameter to the respective communication terminals 10 registered with the soft switch 14 via the SIP server when the software parameter is upgraded to the new parameter in a DB (not shown) therein, thereby performing the upgrade service.

A changeable parameter includes a register IP/register port, a register expiry time, a proxy IP/proxy port, and a retry count/delay timer according to each service.

Figure 2:
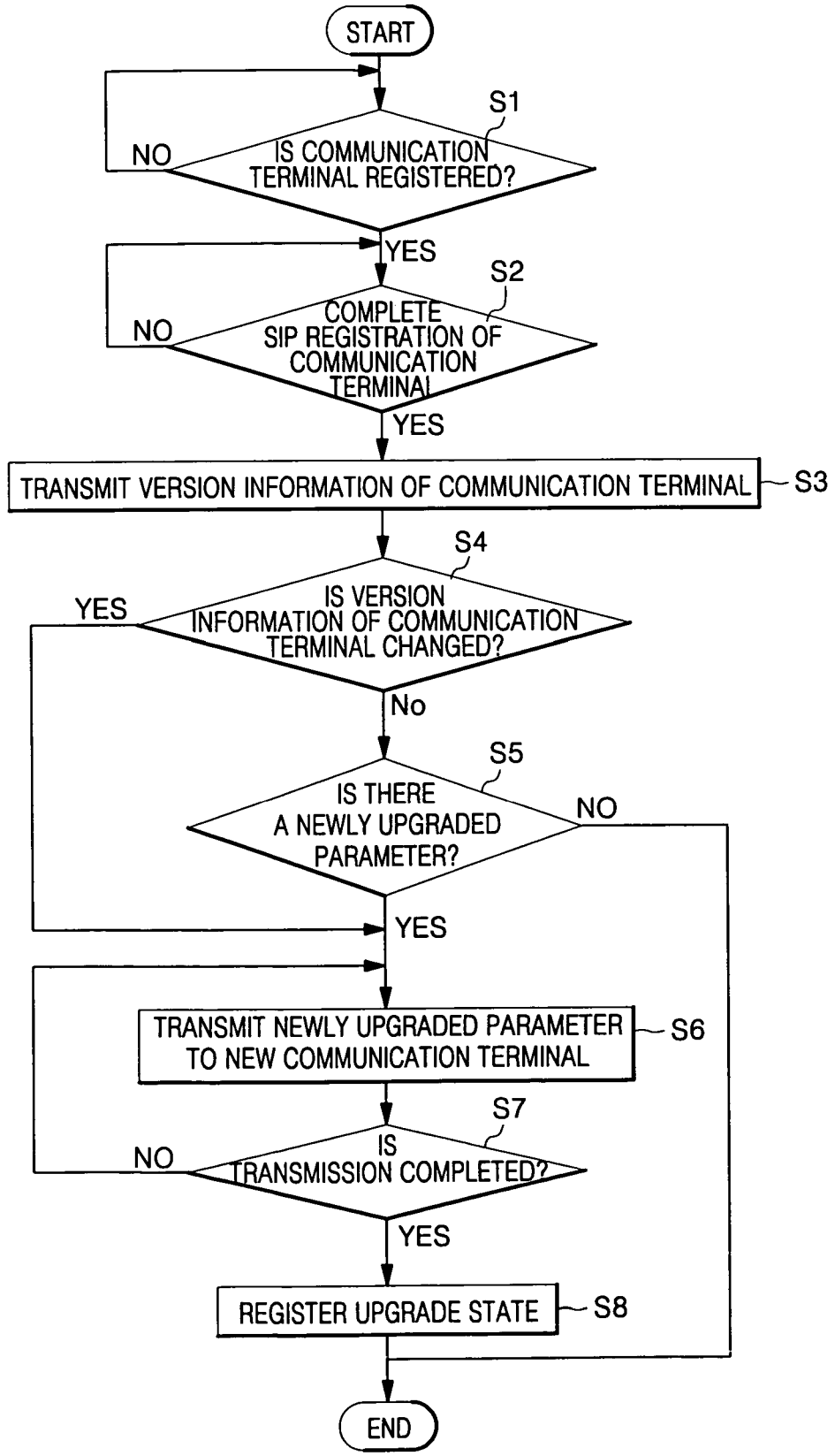
FIG. 2 is a flowchart of a method of changing the operation parameter of the communication terminal using a wireless communication network according to the present invention.

FIG. 2 is a flowchart of a method of changing the operation parameter of the communication terminal using a wireless communication network according to the present invention.

The method of changing the operation parameter can be performed when electrical power is supplied, so that the communication terminal is turned on. If the communication terminal does not start its operation, the upgrade of the parameter does not occur. Also, if the communication terminal is suddenly shut down, since the soft switch does not recognize the status of the communication terminal, it is impossible to upgrade.

If electrical power is supplied so that the communication terminal 10 is turned on, the communication terminal medium-accesses the AP 12 according to a rule of competition or non-competition to transmit a MAC address of the communication terminal 10, so that the AP 12 registers the fact that the communication terminal 12 is operable. That is, when the communication terminal 10 is a WLAN terminal, it tries to medium-access the AP 12 according to a rule of competition or non-competition. The medium-access is performed by the communication terminal 10 transmitting its MAC address to the AP 12, which stores the MAC address to complete registration. However, when the communication terminal 10 is not a WLAN terminal, since there is no need for the AP 12, there is no need of a registration procedure. Instead, the wire communication terminal needs to perform a registration procedure in the soft switch 14 based on SIP.

When the communication terminal completes its registration, the AP 12 informs the soft switch 14 of the registration so that the soft switch 14 recognizes the fact that the communication terminal is registered with the AP 12 (S1).

Then, the communication terminal 10 processes a registration with the soft switch 14 as described above. That is, after it is registered with the AP 12 and thus allowed a medium access, the communication terminal 10 transmits a register message based on the SIP and registers itself with the soft switch 14. Receiving the register message from the communication terminal 10, the soft switch 14 responds to the corresponding communication terminal 10 with an acknowledgment (ACK) of OK 200, whereby a SIP registration of the communication terminal 10 is completed (S2). However, when the communication terminal 10 is a wired LAN terminal rather than the WLAN terminal, the communication terminal 10 transmits a register message directly to the soft switch 14 through the wired LAN, based on the SIP, and the soft switch 14 responds with an ACK of OK 200, which means that the registration is approved, whereby the registration is completed.

If the SIP registration of the communication terminal 10 has been completed, then the soft switch 14 analyzes a data packet of the register message based on the SIP to identify the version information from the registration information of the communication terminal 10. The version information includes a manufacturer, a model, a manufacturing date, a software version (i.e., version information), and a software parameter. The soft switch 14 identifies the version information (i.e., software version) through the analysis procedure and transmits it to the user DB 18 in the terminal information upgrader 25 (S3).

The user DB 18 has respective version information of a plurality of communication terminals in the form of a table. If the version information of the communication terminal 10 transmitted from the soft switch 14 is an old version (S4), the user DB 18 determines that the version information of the communication terminal should be changed and thus transmits a new parameter to the new communication terminal (S6). The new parameter is inserted into a SIP message field in the SIP server 16 and then transmitted. If an ACK of OK 200, which means that the SIP message has been received, is received from the new communication terminal, then the transmission is completed (S7), so that the user DB 18 registers the fact that the corresponding communication terminal 10 has been upgraded to the new parameter (S8).

The user DB 18 hands a parameter upgrade procedure over to the upgrade server 20 when the version information of the communication terminal 10 from the soft switch 14 is the new version information. Then, the upgrade server 20 determines whether or not there is a newly upgraded parameter in a parameter upgrade table in the DB (not shown) installed therein (S5).

If there is no new upgraded parameter, it is determined that no communication terminal needs to upgrade the parameter and the procedure is finished. If there is a new upgraded parameter, the corresponding communication terminal 10 is searched for, and then the new parameter is inserted into the information element identifier field of the reserved region in the SIP message and transmitted to the corresponding communication terminal 10 via the soft switch 14 (S6). The communication terminal 10 receives the SIP message and responds to the soft switch 14 via the ACK of OK 200, which means that the new parameter in the SIP message has been received. Thus, the soft switch 14 determines that the transmission of the new parameter has been completed (S7) and informs the user DB 18 of that fact. The user DB 18 recognizes and registers the fact that the corresponding communication terminal 10 has been upgraded to the new parameter (S8).

The upgrade server 20 operates independently. That is, the upgrade server 20 independently performs an upgrade procedure by searching for the corresponding communication terminal whose parameter has been upgraded to the new parameter regardless of the SIP registration of the communication terminal, and transmitting the new parameter to the corresponding communication terminal together with the SIP message, when a new parameter corresponding to a certain communication terminal has been upgraded by a management server.

Figure 3:
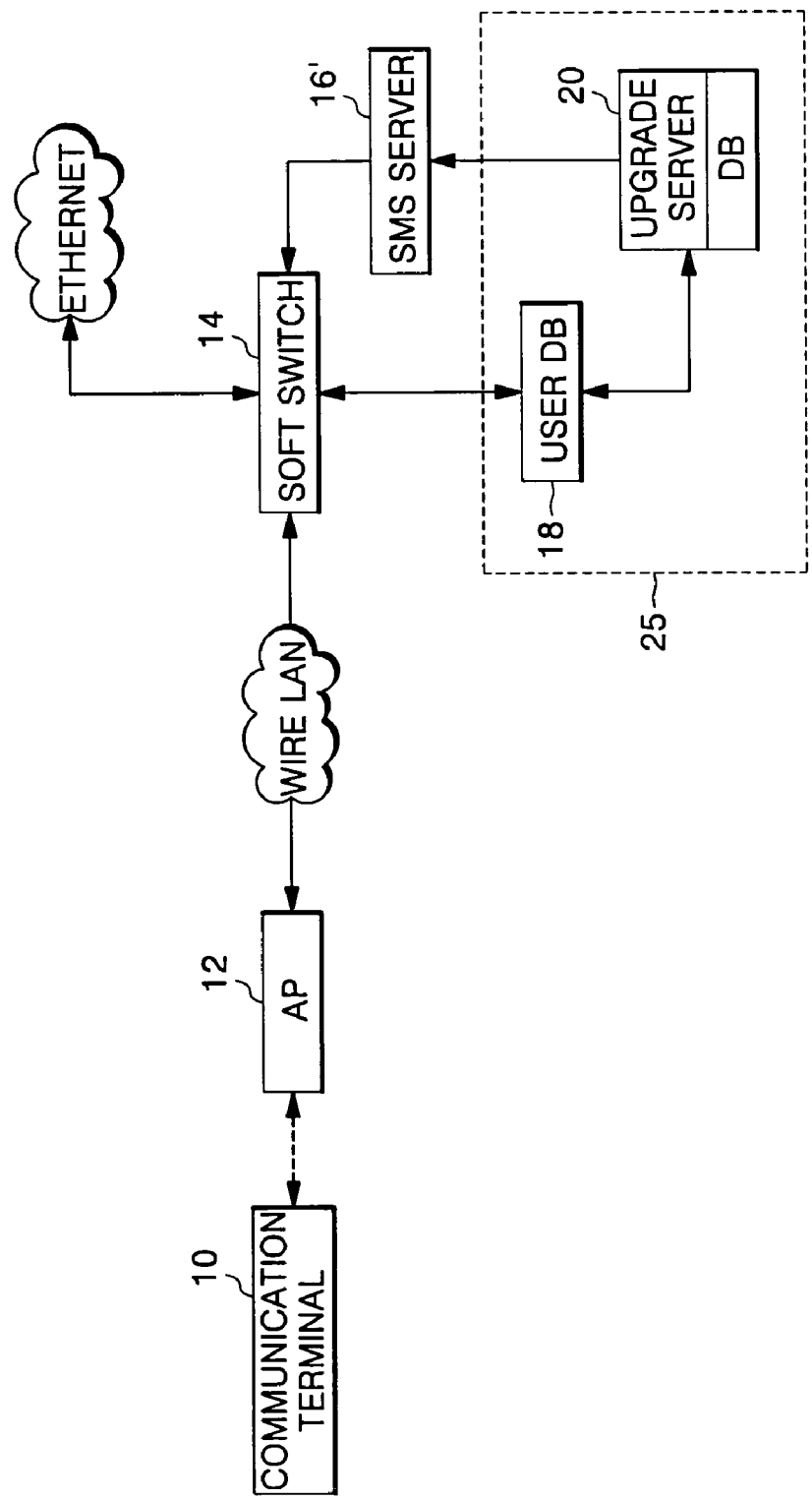
FIG. 3 is a block diagram of a system of changing an operation parameter of a communication terminal according another embodiment of the present invention.

In the system of changing the operation parameter according to the present invention, upgrading the new parameter using a SMS message other than the SIP message is shown in FIG. 3, which is a block diagram of a system of changing an operation parameter of a communication terminal according another embodiment of the present invention.

The system for changing the operation parameter of FIG. 3 includes a SMS server 16' which transmits a new parameter stored in the upgrade server 20 to a corresponding communication terminal 10 using the SMS message for upgrading if the user DB 18 and the upgrade server 20 determine that the upgrade is needed, and the same soft switch 14, user DB 18, and upgrade server 20 as in the embodiment of FIG. 1.

A method of changing an operation parameter according to another embodiment of the present invention is the same as the method of FIG. 2 except for the second step. The second step is as follows.

The soft switch 14 receives a register message from the communication terminal 10 and performs registration according to the SIP procedure. Then, when the SMS message is received from the communication terminal 10, the soft switch 14 identifies the version information of the communication terminal and transfers it to the user DB 18. The user DB 18 controls the SMS server 16' so that the upgrade server 20 can perform an upgrade procedure according to the old version information. The upgrade procedure is performed such that the new parameter is inserted into the SMS message and then transmitted to the corresponding communication terminal 10.

The upgrade server 20 is aware of the fact that the communication terminal 10 uses the SMS message to transmit the new parameter according to the upgrade procedure described above.

The reset operation and steps are the same as in FIG. 2.

As described above, according to the present invention, the necessary software is transmitted in the applicable message format so that the communication terminal can be rapidly and accurately adapted to the network environment to maintain optimum operation condition. It will be understood by those skilled in the art that a variety of modifications and variations can be made to the present invention without departing from the spirit or scope of the present invention as defined in the appended claims and their equivalents.

As described above, since the necessary software is transmitted in the applicable message format so that the communication terminal can be rapidly and accurately adapted to the network environment to maintain the optimum operation condition, the latest functional operation condition can be maintained so that a user can use the latest functions, enhancing user satisfaction, and also optimum network condition can be maintained.

What is claimed is:

1. A system of changing an operation parameter of a communication terminal, the system comprising:
   a user database adapted to store upgrade state information for an operation parameter of the communication terminal, and when version information for the communication terminal corresponds with an old operation parameter, adapted to transmit a new operation parameter to the communication terminal in dependence upon information indicative of the new operation parameter stored in the user database; and
   an upgrade server that, when the version information for the communication terminal corresponds with the new operation parameter in conformance with the information indicative of the new operation parameter stored in the user database, determines, by reference to a database different from the user database, whether the communication terminal having the new operation parameter needs to be upgraded by an upgraded operation parameter, and provides the upgraded operation parameter information in dependence upon information indicative of the upgraded operation parameter stored in the database to the communication terminal upon a determination that the communication terminal having the new operation parameter needs to be upgraded with the ungraded operation parameter information.

2. The system of claim 1, further comprising a Session Initiation Protocol (SIP) server adapted to receive a SIP message containing the version information from the communication terminal and to transmit the version information to the upgrade server, and to receive the upgraded operation parameter information from the upgrade server and to transmit an SIP message containing the upgraded operation parameter information to the corresponding communication terminal.

3. The system of claim 1, further comprising a Short Message Service (SMS) server adapted to receive a SMS message containing the version information from the communication terminal and to transmit the version information to the upgrade server, and to receive upgraded operation parameter information from the upgrade server and to transmit an SMS message containing the ungraded operation parameter information to the corresponding communication terminal.

4. The system of claims 1, further comprising a soft switch adapted to perform a Session Initiation Protocol (SIP) registration procedure from the communication terminal and to transmit one of SIP messages and a Short Message Service (SMS) message containing the new parameter information to the communication terminal.

5. The system of claim 4, further comprising an Access Point (AP) arranged between the communication terminal and the soft switch and adapted to allow medium access according to a rule of one of competition and non-competition.

6. The system of claim 5, wherein the communication terminal comprises a Wireless Local Area Network (WLAN) terminal including one of a WiFi phone, a Zigbee phone, a Bluetooth phone, and a UWB phone.

7. The system of claim 1, wherein the upgrade server comprises a database installed therein and adapted to store the new operation parameter information.

8. A method of changing an operation parameter of a communication terminal, the method comprising:
   when version information of the communication terminal corresponds with an old operation parameter, transmitting, at a user database, a new operation parameter to the communication terminal in dependence upon information indicative of the new operation parameter stored in the user database;
   recognizing that an operation parameter stored in a database different from the user database includes a newly upgraded parameter;
   when the version information of the communication terminal corresponds with the new operation parameter, determining at an upgrade server, in dependance upon information indicative of the newly upgraded parameter stored in the database, whether the communication terminal having the new operation parameter needs to be upgraded with the newly upgraded parameter by reference to the database; and providing the newly ungraded operation parameter information by reference to the database to the communication terminal upon determining that the communication terminal having the new operation parameter needs to be ungraded with the newly upgraded operation parameter information; and
   performing, at the communication terminal, an upgrade procedure for the communication terminal by the newly upgraded parameter.

9. The method of claim 8, further comprising:
   recognizing a register message from the communication terminal;
   identifying the version information for the communication terminal from the register message;
   determining whether the version information belongs to a new communication terminal which has not been registered; and
   performing the upgrade procedure for the new communication terminal to provide the new parameter.

10. The method of claim 9, wherein the upgrade procedure comprises:
    producing a Session Initiation Protocol (SIP) message containing the new parameter; and
    transmitting the SIP message to the communication terminal via a network.

11. The method of claim 10, wherein the new parameter includes at least one of a call-related parameter, an SIP stack parameter, and a multimedia message service parameter.

12. The method of claim 10, further comprising receiving and relaying the SIP message to the communication terminal via a Wireless Local Area Network (WLAN).

13. The method of claim 12, wherein the communication terminal comprises a WLAN terminal including one of a WiFi phone, a Zigbee phone, a Bluetooth phone, and a UWB phone.

14. A method of changing an operation parameter of a communication terminal, the method comprising:

providing a user database for storing upgrade state information for an operation parameter of the communication terminal, and when version information for the communication terminal corresponds with an old operation parameter, the user database for transmitting a new operation parameter to the communication terminal in dependence upon information indicative of the new operation parameter stored in the user database;

providing an upgrade server that, when the version information for the communication terminal corresponds with the new operation parameter in conformance with the information indicative of the new operation parameter stored in the user database, determines, by reference to a database different from the user database, whether the communication terminal having the new operation parameter needs to be upgraded by an upgraded operation parameter, and provides the upgraded operation parameter information in dependence upon information indicative of the upgraded operation parameter stored in the database to the communication terminal upon a determination that the communication terminal having the new operation parameter needs to be upgraded with the upgraded operation parameter information;

providing the database different from the user database; and providing the communication terminal performing an upgrade procedure for the communication terminal by the upgraded operation parameter.

15. A communication system, comprising:

a first database, when version information of a termination object corresponds with an old operation parameter, transmitting a new operation parameter to the termination object in dependence upon information indicative of the new operation parameter stored in the first database;

a second database being inspected for making a determination of whether the second database has a newly upgraded parameter, with the second database being different from the first database;

a server that, when the version information of the termination object corresponds with the new operation parameter, determining in dependence upon information indicative of the newly upgraded parameter stored in the second database, whether the termination object having the new operation parameter needs to be upgraded with the newly upgraded parameter by reference to the second database; and providing the newly upgraded operation parameter information by reference to the second database to the termination object upon determining that the termination object having the new operation parameter needs to be upgraded with the newly upgraded operation parameter information and;

the termination object performing an upgrade procedure for the termination object by the newly upgraded parameter.

* * * * *